United States Patent
Zeng et al.

(10) Patent No.: US 12,469,311 B2
(45) Date of Patent: Nov. 11, 2025

(54) PART MACHINING FEATURE RECOGNITION METHOD BASED ON MACHINE VISION LEARNING RECOGNITION

(71) Applicant: CHENGDU AIRCRAFT INDUSTRIAL (GROUP) CO., LTD., Chengdu (CN)

(72) Inventors: Debiao Zeng, Chengdu (CN); Wenping Mou, Chengdu (CN); Xin Gao, Chengdu (CN); Pengcheng Wang, Chengdu (CN); Jianguo Shu, Chengdu (CN); Binli Wang, Chengdu (CN); Guobo Zhao, Chengdu (CN)

(73) Assignee: CHENGDU AIRCRAFT INDUSTRIAL (GROUP) CO., LTD., Chengdu (TW)

( * ) Notice: Subject to any disclaimer, the term of this patent is extended or adjusted under 35 U.S.C. 154(b) by 0 days.

(21) Appl. No.: 18/769,707

(22) Filed: Jul. 11, 2024

(65) Prior Publication Data

US 2024/0362934 A1    Oct. 31, 2024

Related U.S. Application Data

(63) Continuation of application No. PCT/CN2022/125235, filed on Oct. 14, 2022.

(30) Foreign Application Priority Data

Jan. 14, 2022 (CN) .......................... 202210042480.2

(51) Int. Cl.
*G06V 20/64* (2022.01)
*G06T 19/00* (2011.01)
(Continued)

(52) U.S. Cl.
CPC ............ *G06V 20/647* (2022.01); *G06T 19/00* (2013.01); *G06V 10/457* (2022.01);
(Continued)

(58) Field of Classification Search
CPC .. G06V 20/647; G06V 10/457; G06V 10/764; G06V 10/7715; G06V 10/774;
(Continued)

(56) References Cited

U.S. PATENT DOCUMENTS 7,587,082 B1    9/2009  Rudin et al.
2019/0065629 A1  2/2019  Phinney et al.
(Continued)

FOREIGN PATENT DOCUMENTS

CN    106919941 A    7/2017
CN    110136447 A    8/2019
(Continued)

OTHER PUBLICATIONS

Dai, Research on 3D Mapping Method of 2D Image and Modeling, Master's Thesis submitted to Wuhan Institute of Technology, dated Aug. 15, 2019.
(Continued)

*Primary Examiner* — Maurice L. Mcdowell, Jr.
(74) *Attorney, Agent, or Firm* — Westbridge IP LLC (57) ABSTRACT

A part machining feature recognition method based on machine vision learning recognition comprises sample training and part machining feature recognition. The sample training specifically refers to obtaining the 2D images of different 3D models of parts at different angles, marking machining feature information, constructing a 2D image sample, and then performing feature recognition training on the image recognition model using the 2D image samples; the part machining feature recognition specifically refers to taking 2D image screenshots from multiple view angles,
(Continued)

recognizing all machining features from 2D image screenshots using the trained image recognition model, mapping the recognized machining features to the 3D model of parts with machining features to be recognized based on the view angle relationship, marking the machining features and geometric surfaces contained in each feature, and completing the automatic recognition of part machining features.

9 Claims, 4 Drawing Sheets

(51) Int. Cl.
 *G06V 10/44* (2022.01)
 *G06V 10/764* (2022.01)
 *G06V 10/77* (2022.01)
 *G06V 10/774* (2022.01)

(52) U.S. Cl.
 CPC ........ *G06V 10/764* (2022.01); *G06V 10/7715* (2022.01); *G06V 10/774* (2022.01); *G06T 2210/21* (2013.01); *G06T 2219/004* (2013.01)

(58) Field of Classification Search
 CPC .............. G06T 19/00; G06T 2210/21; G06T 2219/004; G06T 15/20; G06F 18/00; G06F 18/217; G06F 18/24; G06F 18/214
 See application file for complete search history.

(56) References Cited

U.S. PATENT DOCUMENTS

| | | | | |
|---|---|---|---|---|
| 2019/0096135 A1* | 3/2019 | Dal Mutto | ........ | G06F 18/24765 |
| 2019/0108396 A1* | 4/2019 | Dal Mutto | ............. | G06V 20/52 |
| 2021/0166477 A1* | 6/2021 | Bunkasem | ........... | G06V 10/776 |
| 2022/0044441 A1* | 2/2022 | Kalra | ..................... | G06V 10/82 |
| 2024/0265616 A1* | 8/2024 | Pickard | ................... | G06T 15/20 |

FOREIGN PATENT DOCUMENTS

| | | |
|---|---|---|
| CN | 110795797 A | 2/2020 |
| CN | 110942107 A | 3/2020 |
| CN | 112036317 A | 12/2020 |
| CN | 112613551 A | 4/2021 |
| CN | 112668596 A | 4/2021 |
| CN | 113361507 A | 9/2021 |
| CN | 113870097 A | 12/2021 |
| CN | 114067231 A | 2/2022 |
| WO | 2021022970 A1 | 2/2021 |

OTHER PUBLICATIONS

First Office Action issued in counterpart Chinese Patent Application No. 202210042480.2, dated Feb. 25, 2022.

International Search Report and Written Opinion issued in corresponding PCT Application No. PCT/CN2022/125235, dated Nov. 30, 2022.

Li, 3D Model Recognition and Retrieval by Deep Learning, Master's Thesis submitted to Dalian University of Technology, dated Feb. 15, 2021.

Notification to Grant Patent Right for Invention issued in counterpart Chinese Patent Application No. 202210042480.2, dated Mar. 4, 2022.

Tarasiuk et al., Automatic Identification of Local Features Representing Image Content with the Use of Convolutional Neural Networks, Applied Sciences, vol. 10, No. 15, pp. 1-31, dated Jul. 28, 2020.

* cited by examiner

Taking 2D image screenshots of the 3D model of parts with machining features to be recognized from multiple view angles, and recording the interception viewpoint and view angle of each 2D image.

Recognize all machining features in 2D images, and determine the feature type of each machining feature, the geometric surfaces formed by machining features, and the pixel range contained in machining features.

Map the recognized machining features to the 3D model of parts with machining features to be recognized through the image viewpoint and view angle to form a series of machining feature instances.

The features belonging to the same machining feature in a series of obtained machining feature instances are merged to get a new machining feature set.

Compare all geometric surface information contained in the merged machining features with the part to search for geometric surfaces that are not included in the recognized machining features, repeat feature recognition, and complete the recognition of all machining features of the parts.

FIG. 1

Obtain the 2D images of different 3D models of parts at different angles.

The type of machining feature and the geometric surfaces that make up the feature are marked on 2D images to get the 2D image sample of machining features.

Use the said 2D image sample for feature recognition training of the image recognition model.

PART MACHINING FEATURE RECOGNITION METHOD BASED ON MACHINE VISION LEARNING RECOGNITION

CROSS-REFERENCE TO RELATED APPLICATIONS

The present application is a continuation application of International Application No. PCT/CN2022/125235, filed on Oct. 14, 2022, which claims priority to Chinese Patent Application No. 202210042480.2, filed on Jan. 14, 2022. The disclosures of the above-mentioned applications are incorporated herein by reference in their entireties.

TECHNICAL FIELD

The present application relates to the field of computer-aided manufacturing technology, in particular to a part machining feature recognition method based on machine vision learning recognition.

BACKGROUND

The part machining feature recognition is a basic technology to realize the automated design of machining process and the automatic programming of machining digital control programs. As the manufacturing industry gradually shifts from mass production mode to multi-variety and small-batch production mode, the personalization of products is becoming more and more prominent, and the part machining features are becoming more and more complicated. Especially in the aerospace field, in order to reduce the weight of the aircraft, the parts have complex structures, strange shapes, and complicated and changeable machining features, so that the machining feature recognition is very difficult, and the recognition accuracy is low. As a result, the machining process design and machining digital control programming must rely on a large number of manual operations, resulting in a long process preparation cycle and high labor cost. This is a bottleneck in the manufacturing industry to meet the needs of personalized customization quickly and at low cost.

In the prior art, Chinese Patent Publication CN102930108B discloses a rib feature recognition method, which realizes feature recognition based on the connection relationship of geometric surfaces of the parts and the pre-defined features. Chinese Patent Publication CN110795797B discloses an automatic recognition of pre-defined machining features based on the attributed adjacency graph of geometric surfaces of the parts. Chinese Patent Application Publication CN109977972A discloses an intelligent feature recognition method that is based on geometric topological information of parts, and combines artificial bee colony algorithm with BP neural network. Chinese Patent Application Publication CN112488176A discloses the triangular grid partition and data extraction of machining features, and the optimal neural network training model is obtained through neural network training to realize machining feature recognition and support user-defined machining features.

In the prior art, a paper titled "User-defined Method for computer numerical control (CNC) Programming and Machining Features of Complex Structural Components" is also presented. In this paper, the geometric information of machining features is expressed based on holographic attribute surface and edge graphs, and the correlation between geometric information and process information is established based on semantics and rules to realize the definition and recognition of features.

The technical solution may encounter the following problems during actual use.

The definition and recognition methods of machining features are based on the topological connection relationship of geometric surfaces of the parts to achieve the definition and recognition of machining features. The feature structure needs to be defined manually, that is, new feature types are added to the feature library to complete the recognition of new machining features. For complex intersection features, such as the fusion and intersection of grooves, ribs, bosses and holes, it is difficult to effectively define complex intersection features from the perspective of artificial feature definition because of the complex structure. Therefore, the above method is unable to effectively recognize new machining features and complex intersection features, and it is difficult to recognize or recognize incorrect features, so that the subsequent automatic CNC programming results are difficult to meet the machining requirements.

SUMMARY

The present application aims at solving the problem of errors caused by laser signals to analog signals during transmission.

To solve the above technical problems, the present application provides a part machining feature recognition method based on machine vision learning recognition, which can effectively solve the recognition difficulty of complex machining features and new machining features, and improve the recognition accuracy of part machining features.

The present application is achieved by adopting the following technical solutions.

A part machining feature recognition method based on machine vision learning recognition, comprising sample training and part machining feature recognition. The sample training specifically refers to obtaining the 2D images of different 3D models of parts at different angles, marking machining feature information on 2D images, constructing a 2D image sample of the part machining features, and then performing feature recognition training on the image recognition model using the 2D image samples; the part machining feature recognition specifically refers to taking 2D image screenshots of 3D model of parts with machining features to be recognized from multiple view angles, recognizing all machining features from the 2D image screenshots using the trained image recognition model, mapping the recognized machining features to the 3D model of parts with machining features to be recognized based on the view angle relationship, marking the machining features and geometric surfaces contained in each feature on the 3D model of parts with machining features to be recognized, and completing the automatic recognition of part machining features.

The interception viewpoint and view angle of each 2D image is recorded after taking 2D image screenshots.

The specific interception methods of 2D image screenshots are as follows:

the minimum bounding box of the 3D model of parts with machining features to be recognized is calculated, wherein the corner point with the smallest X, Y and Z coordinates of the bounding box is ($X_{min}$, $Y_{min}$, $Z_{min}$), and the corner point with the largest X, Y and Z coordinates is ($X_{max}$, $Y_{max}$, $Z_{max}$);

the minimum circumscribed sphere of the bounding box is calculated, and the center of sphere is set as O and the radius as R;

the viewpoint and view angle are set evenly on the sphere S (center of sphere: O, radius: mR) at a step distance of a°, where m is a constant. The viewpoint and view angle are represented by the longitude and latitude of the sphere as (α, β), where the value range of the longitude α is [0°, 360°], and the value range of the latitude β is [−90°, 90°];

the viewpoint and view angle with the longitude and latitude of (0°, −90°) are set as the initial viewpoint and view angle to intercept 2D images, and the 2D images of the 3D model of parts with machining features to be recognized are intercepted in turn.

Recognizing all machining features from 2D image screenshots specifically refers to determining the types of machining features contained in 2D image screenshots, the geometric surfaces formed by machining features, and the pixel range contained in machining features.

Mapping the recognized machining features to the 3D model of parts with machining features to be recognized based on the view angle relationship specifically refers to mapping the recognized machining features to the 3D model of parts through the image interception viewpoint and view angle to form a series of machining feature instances, specifically including:

a projection plane is constructed based on the viewpoint and view angle of the image, with the viewpoint as the origin and the view angle direction as the normal direction, i.e. the Z-direction;

the X and Y coordinates of a pixel on the geometric surface to which the machining features belong on a 2D image are selected to construct a straight line perpendicular to the projection plane and passing through the pixel point;

the intersection point between the straight line and the 3D model of parts with machining features to be recognized is calculated. The intersection point nearest to the pixel point is the mapping point of the 2D image pixel point on the 3D model of parts with machining features to be recognized, and the geometric surface where the mapping point is located is the geometric surface of the machining feature where the pixel point of the selected 2D image is located; and redundant geometric surfaces are eliminated after the feature instance is constructed.

Marking the machining features and the geometric surfaces contained in each feature on the 3D model of parts with machining features to be recognized to complete the automatic recognition of part machining features specifically refers to merging the features belonging to the same machining feature in a series of obtained machining feature instances to get a new machining feature set; determining whether the new machining feature set contains all geometric surfaces of the part, and if not, storing the geometric surfaces in the geometric surface set N, selecting an appropriate viewpoint and view angle to intercept 2D images again for feature recognition until all geometric surfaces of the part are included in the new machining feature set, and completing the recognition of all machining features of the part.

Merging the features belonging to the same machining feature in a series of obtained machining feature instances to get a new machining feature set specifically refers to:

classifying the machining feature instances based on the type of machining feature;

merging the machining features of the same type, if the main geometric surfaces that make up the feature are identical;

eliminating redundant geometric surfaces from the machining feature instances to be merged, merging the remaining geometric surfaces, and reorganizing them into new machining feature instances.

The specific methods of selecting an appropriate viewpoint and view angle to intercept 2D images again are as follows:

the geometric surface U is selected from the geometric surface set N to obtain a series of discrete points on the geometric surface U and get the normal vectors of the geometric surface U at discrete points;

the normal vectors are merged to get the main normal vector P of the geometric surface U;

the center point M of the geometric surface U is found, and the ray 1 is drawn along the main normal vector P with the center point M as the endpoint;

the intersection point between the ray 1, the part and the sphere S is solved;

if there is no intersection point between the ray 1 and the part, the intersection point between the ray 1 and the sphere S is the appropriate viewpoint, and the opposite direction of the main normal vector P is the appropriate view angle;

if there is an intersection point between the ray and the part, please find the intersection point I nearest to the center point M and obtain the geometric surface T of the part where the intersection point I is located; draw a ray J that intersects with the edge line at the top of the geometric surface T along the height direction of the minimum bounding box of the part, with the center point M as the endpoint; the ray J and the ray 1 form a plane F, and in the plane F, the ray J is rotated by b° away from the ray 1 to get the rotated ray k; the intersection point between the ray k, the part and the sphere S is solved. If there is no intersection point between the ray k and the part, the intersection point between the ray k and the sphere S is the appropriate viewpoint, and the opposite direction of the ray k is the appropriate view angle. Otherwise, it will be impossible to find the appropriate viewpoint and view angle. The machining features will be supplemented and recognized by artificial recognition, where the value of b is greater than 0 and less than or equal to 10.

Obtaining the 2D images of different 3D models of parts at different angles specifically refers to exporting, taking screenshots or taking photos from CAD software to obtain the corresponding 2D images.

Marking machining feature information on 2D images specifically refers to marking each machining feature type, the geometric elements of the features and the pixel range the features contain on the 2D images.

Compared with the prior art, the present application has the following beneficial effects:

Firstly, this method fundamentally avoids defining features artificially. With the machine vision method, the image recognition model is trained by feature 2D images, and the machining features are recognized based on the trained image recognition model. For new features, it is only necessary to add new samples and train the image recognition model; for complex intersection features, it is only necessary to mark them in 2D image samples to recognize complex intersection features. This method can effectively recognize complex intersection features, improve the accuracy of part machining feature recognition, and lay a technical foundation for automatic design of part machining process and automatic programming of machining digital control programs.

Secondly, in this method, 2D images are intercepted from the 3D model of parts with machining features to be recognized from multiple viewpoints and view angles, which can prevent the loss or blurring of small geometric surfaces on the image, and ensure that each geometric surface has a clear pixel on at least one 2D image as far as possible.

Thirdly, redundant geometric surfaces are eliminated after the feature instance is constructed, including the geometric surfaces where pixels may not be clear on 2D images, smaller geometric surfaces that may be occluded, some geometric surfaces that may not be recognized on 2D images, and redundant geometric surfaces. Among them, redundant geometric surfaces specifically refer to multiple geometric surfaces recognized on 2D images, but these geometric surfaces are actually the same geometric surface in 3D digital models.

Lastly, in this method, feature merging is required for machining feature instances, which can effectively avoid the phenomenon that the geometric surface information contained in the machining features recognized based on 2D images may be incomplete and the same machining feature may exist repeatedly due to the different geometric surface information contained in 2D images intercepted from different viewpoints and view angles.

BRIEF DESCRIPTION OF THE DRAWINGS

The present application will be further detailed below in conjunction with the drawings and preferred embodiments of the Specification.

DETAILED DESCRIPTION OF THE EMBODIMENTS

First Embodiment

As a basic embodiment of the present application, the present application includes a part machining feature recognition method based on machine vision learning recognition, comprising sample training and part machining feature recognition. The sample training specifically refers to obtaining the 2D images of different 3D models of parts at different angles, and marking machining feature information on 2D images. A 2D image sample of the part machining features is constructed, and then the 2D image sample is used for feature recognition training of the image recognition model in order to train the image recognition model well.

The part machining feature recognition specifically refers to taking 2D image screenshots of the 3D model of parts with machining features to be recognized from multiple view angles, recognizing all machining features from 2D image screenshots using the trained image recognition model, mapping the recognized machining features to the 3D model of parts with machining features to be recognized based on the view angle relationship, marking the machining features and geometric surfaces contained in each feature on the 3D model of parts with machining features to be recognized, and completing the automatic recognition of part machining features.

Second Embodiment

As a preferred embodiment of the present application, the present application includes a part machining feature recognition method based on machine vision learning recognition, comprising sample training and part machining feature recognition. The sample training specifically includes the following steps.

The 2D images of different 3D models of parts at different angles are obtained by exporting, taking screenshots or taking photos from a computer-aided design (CAD) software, and other ways that can obtain the 2D images of 3D digital model of parts.

The machining feature information is marked on 2D images, that is, each machining feature type, feature geometric element and pixel range contained in the feature are marked on 2D images, and a 2D image sample of the part machining features is constructed.

The 2D image sample is used for feature recognition training of the image recognition model, so that the image recognition model has the ability to recognize all kinds of machining features from the images.

The part machining feature recognition specifically includes the following steps.

The 2D images of the 3D model of parts with machining features to be recognized are intercepted from multiple viewpoints and view angles, and the interception viewpoint and view angle of each image are recorded.

The machining features are recognized on the intercepted 2D images using the trained image recognition model to determine the types of machining features contained herein, the geometric surfaces formed by machining features, and the pixel range contained in machining features.

The recognized machining features are mapped to the 3D model of parts through the image interception viewpoint and view angle to form a series of machining feature instances.

The features belonging to the same machining feature in a series of obtained machining feature instances are merged to get a new machining feature set. All geometric surface information contained in the merged machining features are compared with the part to search for geometric surfaces that are not included in the recognized machining features, and store them in the geometric surface set N. For the geometric surface in the geometric surface set N, appropriate viewpoint and view angle are selected to intercept 2D images again, and the above steps are repeated until the number of geometric surfaces in the geometric surface set N is 0, and thus the recognition of all machining features of the parts is completed.

Third Embodiment

As another preferred embodiment of the present application, the present application includes a part machining feature recognition method based on machine vision learning recognition, comprising sample training and part machining feature recognition. The sample training specifically refers to obtaining the 2D images of different 3D models of parts at different angles, which are high pixel white background images to avoid the interference of image color on machining feature recognition, and then processing the obtained 2D images into grayscale images. Then the machining feature information is marked on 2D images to construct a 2D image sample of the part machining feature. The 2D image sample contains a series of machining features belonging to the type of parts to be recognized, and the samples corresponding to each machining feature must reach a certain number to ensure the training effect of image recognition model. Then the 2D image sample is used for feature recognition training of the image recognition model.

The part machining feature recognition specifically refers to taking 2D image screenshots of the 3D model of parts with machining features to be recognized from multiple view angles, recording the interception viewpoint and view angle of each 2D image, recognizing all machining features from 2D image screenshots using the trained image recognition model, determining the types of machining features contained herein, the geometric surfaces formed by machining features, and the pixel range contained in machining features, and mapping the recognized machining features to the 3D model of parts with machining features to be recognized based on the viewpoint and view angle. The machining features and geometric surfaces contained in each feature are marked on the 3D model of parts with machining features to be recognized, and the automatic recognition of part machining features is also completed.

Among them, intercepting 2D images from the 3D model of parts with machining features to be recognized from multiple viewpoints and view angles is to prevent the loss or blurring of small geometric surfaces on the image, and to ensure that each geometric surface has a clear pixel on at least one 2D image as far as possible. The specific interception methods are detailed below.

The minimum bounding box of the 3D model of parts with machining features to be recognized is calculated, wherein the corner point with the smallest X, Y and Z coordinates of the bounding box is ($X_{min}$, $Y_{min}$, $Z_{min}$), and the corner point with the largest X, Y and Z coordinates is ($X_{max}$, $Y_{max}$, $Z_{max}$).

The minimum circumscribed sphere of the bounding box is calculated, and the center of sphere is set as O and the radius as R.

The viewpoint and view angle are set evenly on the sphere S (center of sphere: O, radius: mR) at a step distance of a°, where m is a constant. The viewpoint and view angle are represented by the longitude and latitude of the sphere as ($\alpha$, $\beta$), where the value range of the longitude $\alpha$ is [0°, 360°], and the value range of the latitude $\beta$ is [−90°, 90°].

The viewpoint and view angle with the longitude and latitude of (0°, −90°) are set as the initial viewpoint and view angle to intercept 2D images, and the 2D images of 3D model of parts with machining features to be recognized are intercepted in turn.

The specific method of mapping the recognized machining features to the 3D model of parts through the image interception viewpoint and view angle to form a series of machining feature instances is as follows:
  a projection plane is constructed based on the viewpoint and view angle of the image, with the viewpoint as the origin and the view angle direction as the normal direction, i.e., the Z-direction;
  the X and Y coordinates of a pixel on the geometric surface to which the machining features belong on a 2D image are selected to construct a straight line perpendicular to the projection plane and passing through the pixel point;
  the intersection point between the straight line and the 3D model of parts with machining features to be recognized is calculated. The intersection point nearest to the pixel point is the mapping point of the 2D image pixel point on the 3D model of parts with machining features to be recognized, and the geometric surface where the mapping point is located is the geometric surface of the machining feature where the pixel point of the selected 2D image is located; and
  smaller geometric surfaces may be unclear or obscured on 2D images, and some geometric surfaces may not be recognized on 2D images, or multiple geometric surfaces recognized on 2D images may actually be the same geometric surface on a 3D digital model, so redundant geometric surfaces need to be eliminated after the feature instance is constructed.

Fourth Embodiment

Figure 2:
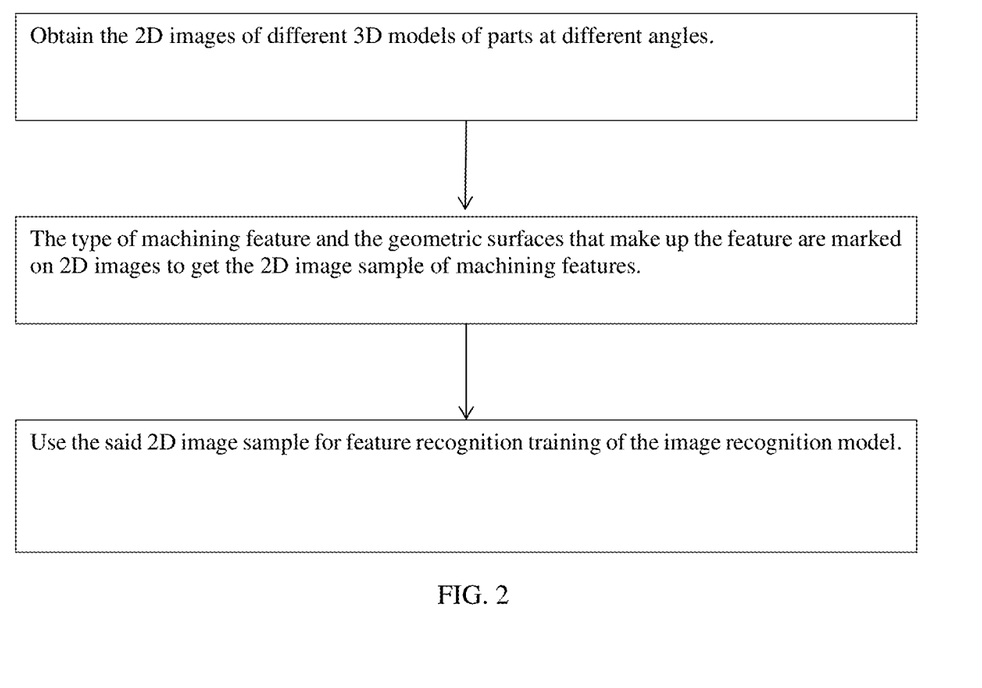
FIG. 2 is a process diagram of sample training in the present application.

As the best embodiment of the present application, the present application includes a part machining feature recognition method based on machine vision learning recognition, comprising sample training and part machining feature recognition. Referring to FIG. 2 of the Specification, the sample training specifically includes the following steps:

The 2D images with high pixel grayscale of the 3D model of parts are obtained from the CAD software at different angles.

The type of machining feature and the geometric surfaces that make up the feature are marked on 2D images to get the 2D image sample of machining features. Among them, the type of machining feature includes grooves, ribs and holes, and the number of samples corresponding to each type of machining feature is not less than 500 to ensure the training effect of image recognition model.

The 2D image sample is used for feature recognition training of the image recognition model, so that the image recognition model has the ability to recognize all kinds of machining features from the images.

Figure 1:
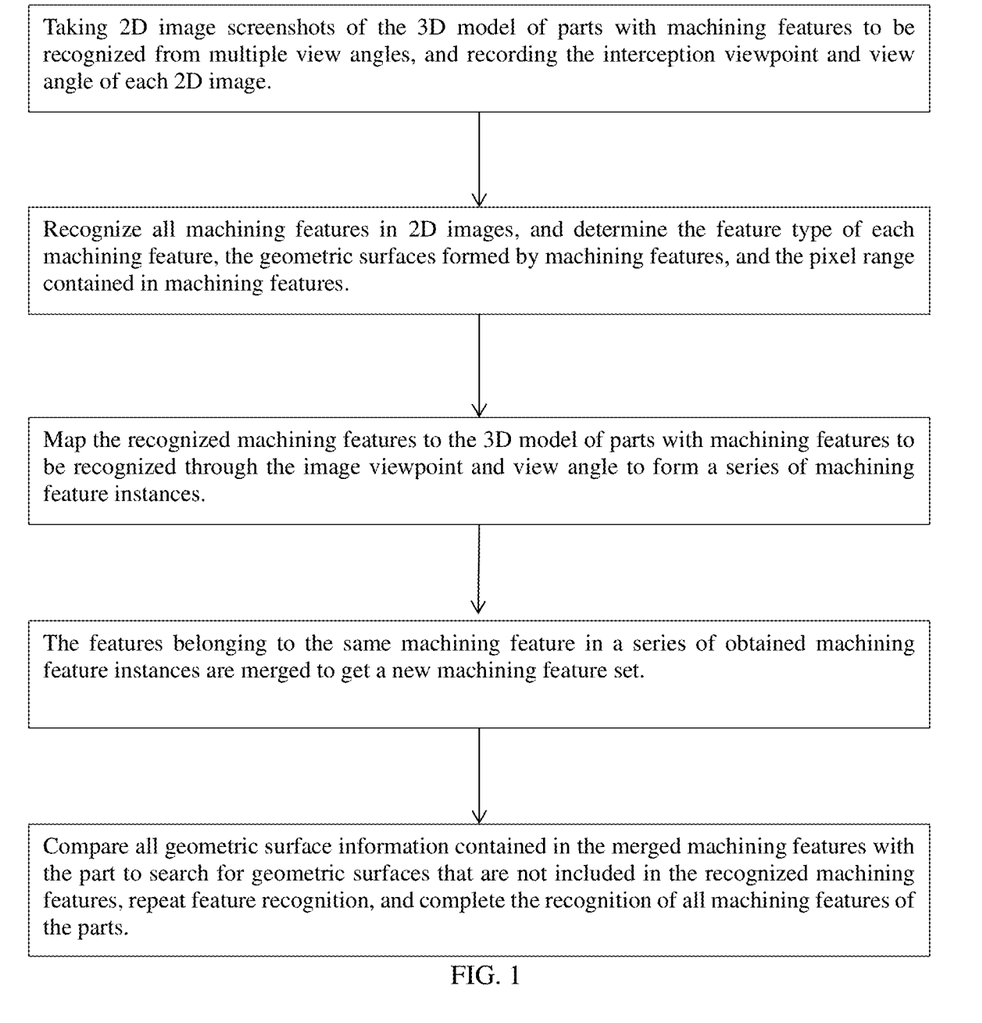
FIG. 1 is a process diagram of part machining feature recognition in the present application.

Referring to FIG. 1 of the Specification, the part machining feature recognition specifically includes the following steps.

Taking 2D image screenshots of the 3D model of parts with machining features to be recognized from multiple view angles, and recording the interception viewpoint and view angle of each 2D image. Among them, the specific interception methods are detailed below.

The minimum bounding box B of the 3D model of parts with machining features to be recognized is calculated.

The minimum circumscribed sphere of the bounding box B is calculated, and the center of sphere is set as O and the radius as R=758.8 mm.

Figure 3:
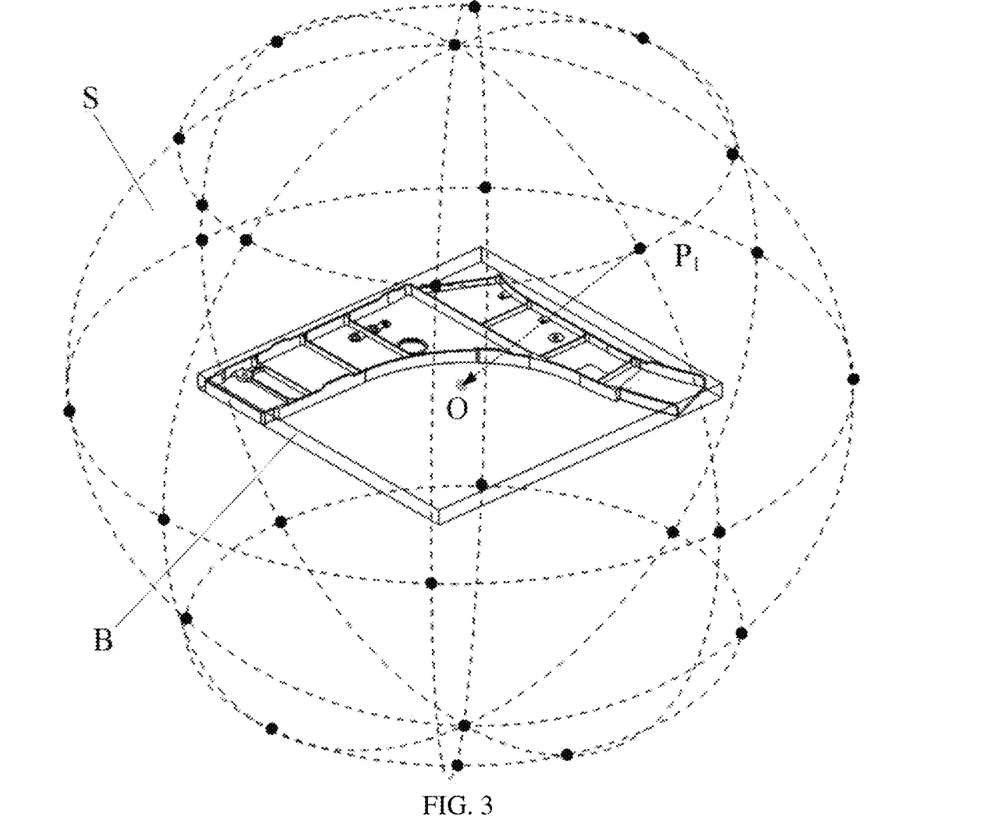
FIG. 3 is a schematic diagram of the viewpoint and view angle of the parts in the present application.

The viewpoint and view angle are set evenly on the sphere S (center of sphere: O, radius: 1.5R) at a step distance of 45°. The viewpoint and view angle are represented by the longitude and latitude of the sphere as ($\alpha$, $\beta$), where the value range of the longitude $\alpha$ is [0°, 360°], and the value range of the latitude $\beta$ is [−90°, 90°]. Then the value range of the longitude $\alpha$ is {0°, 45°, 90°, 135°, 180°, 225°, 270°, 315°}, and the value range of the latitude $\beta$ is {−90°, −45°, 0°, 45°, 90°}. Referring to FIG. 3 of the Specification, one of the viewpoint P1 is (45°, 0°), and the corresponding view angle is $\overrightarrow{P_1O}$.

The 2D images of the 3D model of parts are intercepted in proper order along the viewpoint and view angle.

All machining features are recognized from 2D image screenshots using the trained image recognition model to determine the types of machining features, the geometric surfaces formed by machining features, and the pixel range contained in machining features.

Mapping the recognized machining features to the 3D model of parts with machining features to be recognized through the image viewpoint and view angle to form a series of machining feature instances specifically refers to:
a projection plane is constructed based on the viewpoint and view angle of the image, with the viewpoint as the origin and the view angle direction as the normal direction (Z-direction);
the X and Y coordinates of a pixel on the geometric surface to which the machining features belong on a 2D image are selected to construct a straight line perpendicular to the projection plane and passing through the pixel point;
the intersection point between the straight line and the 3D digital model of parts is calculated. The intersection point nearest to the pixel point is the mapping point of the 2D image pixel point on the 3D digital model, and the geometric surface where the mapping point is located is the geometric surface of the machining feature where the pixel point of the selected 2D image is located;
smaller geometric surfaces may be unclear or obscured on 2D images, and some geometric surfaces may not be recognized on 2D images, or multiple geometric surfaces recognized on 2D images may actually be the same geometric surface on a 3D digital model, so redundant geometric surfaces need to be eliminated after the feature instance is constructed.

The features belonging to the same machining feature in a series of obtained machining feature instances are merged to get a new machining feature set. The method of feature merging is as follows:
classifying the machining feature instances based on the type of machining feature;
the machining features of the same type are merged if the main geometric surfaces that make up the feature are identical, such as groove features containing the same groove web plate surface, hole features with the same sidewall surface, and reinforcement features with the same geometric surface at the top of the reinforcement;
eliminating redundant geometric surfaces from the machining feature instances to be merged, merging the remaining geometric surfaces, and reorganizing them into new machining feature instances.

All geometric surface information contained in the merged machining features are compared with the part to search for geometric surfaces that are not included in the recognized machining features, and store them in the geometric surface set N.

Figure 4:
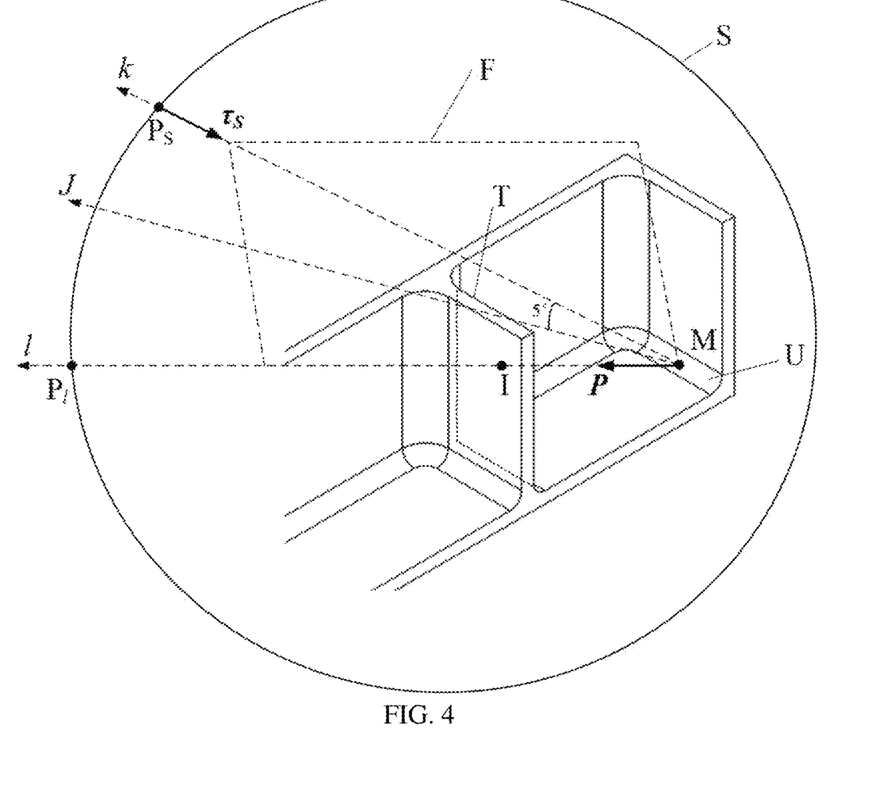
FIG. 4 is a schematic diagram of solving viewpoints and view angles corresponding to unrecognized geometric surfaces in the present application.

Referring to FIG. 4 of the Specification, for the geometric surface U in the geometric surface set N, appropriate viewpoint and view angle are selected to intercept 2D images again and complete the recognition of all machining features of the parts. The specific method is as follows.

First, a series of discrete points are obtained on the geometric surface U, that is, a series of discrete points are obtained according to the set spacing, and the normal vectors of the geometric surface U at the discrete points are obtained, and the above normal vectors are merged to get the main normal vector P of the geometric surface U.

The center point M of the geometric surface U is found, and the ray 1 is drawn along the main normal vector P with the center point M as the endpoint.

The ray 1 intersects with the part and the sphere S made in step 4.

In the intersection point between the ray 1 and the part, the closest intersection point with the center point M is I, and the intersection point with the sphere S is $P_L$.

The geometric surface T of the part where the intersection point I is located is obtained.

Draw a ray J that intersects with the edge line at the top of the geometric surface T along the height direction of the minimum bounding box of the part, with the center point M as the endpoint.

The ray J and the ray 1 form a plane F, and in the plane F, the ray J is rotated by b° away from the ray 1 to get the rotated ray k, where the value of b is greater than 0 and less than or equal to 10. The value is 5° in this embodiment.

If there is no intersection point between the ray k and the part, the intersection point PS between the ray k and the sphere S is the appropriate viewpoint, and the opposite direction $\tau_s$ of the ray k is the appropriate view angle. 2D images are intercepted again based on the viewpoint and view angle, and the above steps are repeated, that is, the feature recognition is repeated until the number of geometric surfaces in the geometric surface set N is 0, and thus the recognition of all machining features of the parts is completed.

To sum up, all other corresponding transformation schemes, made by ordinary technicians in this field without creative mental work according to the technical proposals and ideas of the present application after reading the documents of the present application, belong to the scope protected by the present application.

What is claimed is:

1. A part machining feature recognition method based on machine vision learning recognition, comprising:
a processor that performs the following steps:
sample training and part machining feature recognition, wherein the sample training comprises:
obtaining two-dimensional (2D) images of different three-dimensional (3D) models of parts at different angles;
marking machining feature information on the 2D images;
constructing a 2D image sample of the part machining features; and
performing feature recognition training on an image recognition model using the 2D image samples,
wherein the part machining feature recognition comprises:
taking 2D image screenshots of the 3D model of parts with machining features to be recognized from multiple view angles;
recognizing all machining features from 2D image screenshots using the trained image recognition model;
mapping the recognized machining features to the 3D model of parts with machining features to be recognized based on the view angle relationship;
marking the machining features and geometric surfaces contained in each feature on the 3D model of parts with machining features to be recognized; and
completing the automatic recognition of part machining features;
wherein taking 2D image screenshots comprises:
calculating the minimum bounding box of the 3D model of parts with machining features to be recognized, wherein the corner point with the smallest X, Y and Z coordinates of the bounding box is ($X_{min}$, $Y_{min}$, $Z_{min}$), and the corner point with the largest X, Y and Z coordinates is ($X_{max}$, $Y_{max}$, $Z_{max}$);
calculating the minimum circumscribed sphere of the bounding box, and setting the center of sphere as O and the radius as R;

setting the viewpoint and view angle evenly on the sphere S (center of sphere: O, radius: mR) at a step distance of a°, wherein m is a constant, the viewpoint and view angle are represented by the longitude and latitude of the sphere as (α, β), the value range of the longitude a is [0°, 360°], and the value range of the latitude β is [−90°, 90°]; and setting the viewpoint and view angle with the longitude and latitude of (0°, −90° as the initial viewpoint and view angle to intercept 2D images, and the 2D images of the 3D model of parts with machining features to be recognized are intercepted in turn.

2. The part machining feature recognition method based on machine vision learning recognition according to claim 1, wherein the interception viewpoint and view angle of each 2D image is recorded after taking 2D image screenshots.

3. The part machining feature recognition method based on machine vision learning recognition according to claim 2, wherein mapping the recognized machining features to the 3D model of parts with machining features to be recognized based on the view angle relationship refers to mapping the recognized machining features to the 3D model of parts through an image interception viewpoint and view angle to form a series of machining feature instances, and comprises:

constructing a projection plane based on the viewpoint and view angle of the image, with the viewpoint as the origin and the view angle direction as the normal direction, i.e. the Z-direction;

selecting the X and Y coordinates of a pixel on the geometric surface to which the machining features belong on a 2D image to construct a straight line perpendicular to the projection plane and passing through the pixel point;

calculating the intersection point between the straight line and the 3D model of parts with machining features to be recognized, wherein the intersection point nearest to the pixel point is the mapping point of the 2D image pixel point on the 3D model of parts with machining features to be recognized, and the geometric surface where the mapping point is located is the geometric surface of the machining feature where the pixel point of the selected 2D image is located; and eliminating the redundant geometric surfaces after the feature instance is constructed.

4. The part machining feature recognition method based on machine vision learning recognition according to claim 3, wherein marking the machining features and the geometric surfaces contained in each feature on the 3D model of parts with machining features to be recognized to complete the automatic recognition of part machining features comprises:

merging the features belonging to the same machining feature in a series of obtained machining feature instances to get a new machining feature set;

in response to that the new machining feature set skips containing all geometric surfaces of the part, storing the geometric surfaces in the geometric surface set N, selecting an appropriate viewpoint and view angle to intercept 2D images again for feature recognition until all geometric surfaces of the part are comprised in the new machining feature set; and completing the recognition of all machining features of the part.

5. The part machining feature recognition method based on machine vision learning recognition according to claim 4, wherein merging the features belonging to the same machining feature in a series of obtained machining feature instances to get a new machining feature set comprises:

classifying the machining feature instances based on the type of machining feature;

merging the machining features of the same type, in response to that the main geometric surfaces that make up the feature are identical; and eliminating redundant geometric surfaces from the machining feature instances to be merged, merging the remaining geometric surfaces, and reorganizing them into new machining feature instances.

6. The part machining feature recognition method based on machine vision learning recognition according to claim 4, wherein selecting an appropriate viewpoint and view angle to intercept 2D images again comprises:

selecting the geometric surface U from the geometric surface set N to obtain a series of discrete points on the geometric surface U and get the normal vectors of the geometric surface U at discrete points;

merging the normal vectors to get the main normal vector P of the geometric surface U;

founding the center point M of the geometric surface U, and drawing the ray 1 along the main normal vector P with the center point M as the endpoint;

solving the intersection point between the ray 1, the part and the sphere S;

in response to that there is no intersection point between the ray 1 and the part, the intersection point between the ray 1 and the sphere S being the appropriate viewpoint, and the opposite direction of the main normal vector P being the appropriate view angle;

in response to that there is an intersection point between the ray and the part, finding the intersection point I nearest to the center point M and obtaining the geometric surface T of the part where the intersection point I is located; drawing a ray J that intersects with the edge line at the top of the geometric surface T along the height direction of the minimum bounding box of the part, with the center point M as the endpoint; the ray J and the ray 1 form a plane F, and in the plane F, the ray J is rotated by b° away from the ray 1 to get the rotated ray k; solving the intersection point between the ray k, the part and the sphere S, in response to that there is no intersection point between the ray k and the part, the intersection point between the ray k and the sphere S is the appropriate viewpoint, and the opposite direction of the ray k is the appropriate view angle; in response to that there is no intersection point between the ray k and the part, the appropriate viewpoint and view angle being not found, supplementing and recognizing the machining features by artificial recognition, where the value of b is greater than 0 and less than or equal to 10.

7. The part machining feature recognition method based on machine vision learning recognition according to claim 1, wherein recognizing all machining features from 2D image screenshots comprises determining the types of machining features contained in 2D image screenshots, the geometric surfaces formed by machining features and the pixel range contained in machining features.

8. The part machining feature recognition method based on machine vision learning recognition according to claim 1, wherein obtaining the 2D images of different 3D models of parts at different angles comprises exporting, taking screenshots or taking photos from a computer-aided design (CAD) software to obtain the corresponding 2D images.

9. The part machining feature recognition method based on machine vision learning recognition according to claim 1, wherein marking machining feature information on 2D images comprises marking each machining feature type, the geometric elements of the features and the pixel range the features contained on 2D images.

\* \* \* \* \*